May 11, 1954     C. W. KIRSCH     2,678,245

BEARING

Filed Oct. 4, 1951

INVENTOR.
Carl W. Kirsch
BY
Harry S. Dumass
ATTORNEY.

Patented May 11, 1954

2,678,245

UNITED STATES PATENT OFFICE 2,678,245

BEARING

Carl W. Kirsch, Canton, Ohio, assignor to The Hoover Company, North Canton, Ohio, a corporation of Ohio Application October 4, 1951, Serial No. 249,730

10 Claims. (Cl. 308—187.1)

The present invention relates to bearings and more particularly to a supporting housing for an anti-friction bearing for use in suction cleaners.

The main object of the present invention is to provide a bearing assembly which is simple to manufacture and assemble in which all dimensions can be held in close tolerances and which can be assembled as a unit for later assembly with a suction cleaner.

More particularly according to the present invention, a supporting cup is drawn of sheet metal in which the inner and outer diameters are accurately formed by the drawing operation and its vertical height is accurately controlled by thereafter machining the open end of the wall of the cup to the exact dimension desired so as to form positioning surfaces.

The supporting cup per se comprises a main supporting shell having accurately drawn inner and outer diameters, a supporting shoulder extending inwardly at one end of the shell, machined positioning surfaces at the other end of the shell and supporting tabs extending upwardly from the machined positioning surfaces.

The shell is also formed with a depressed annular portion beyond the shoulder for receiving a sealing ring, the depressed portion having a shaft receiving opening therein.

The entire bearing assembly according to the present invention comprises the above described cup or shell, a sealing ring within the under depressed portion, a retainer ring having a flange resting on the shoulder of the shell and a dished portion engaging the sealing ring, a ball bearing having its outer ring resting on the flange of the retainer ring, a second retainer ring having a flange resting on the other end of the outer race of the bearing and an outwardly dished portion, a second sealing ring resting on the dished portion of the second retaining ring, a wave type spring ring resting on the flange of the second retaining ring and a clamping plate having a supporting flange and a dished portion for receiving the second sealing ring separated by an annular depressed portion resting on the spring ring. The supporting flange rests on the machined positioning surfaces of the supporting cup and has openings for receiving the supporting tabs of the supporting cup. The supporting tabs are bent over into contact with the outer surface of the supporting flange to form a completed assembly.

According to a second modification the clamping plate is cut away along the inner edge of the depressed portion. A separate retainer ring is provided having a dished portion for receiving the second sealing ring and a springy flange which replaces the spring ring of the first modification.

Other objects and advantages of the present invention will become apparent as the description proceeds when taken in connection with the accompanying drawings in which.

Figure 2:
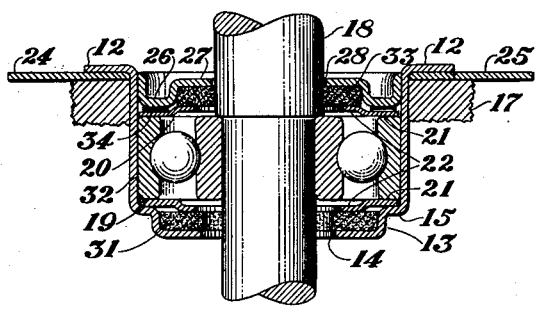
Figure 2 is a cross sectional view of the modification of Fig. 1 showing the parts in their assembled relationship.
Figure 1:
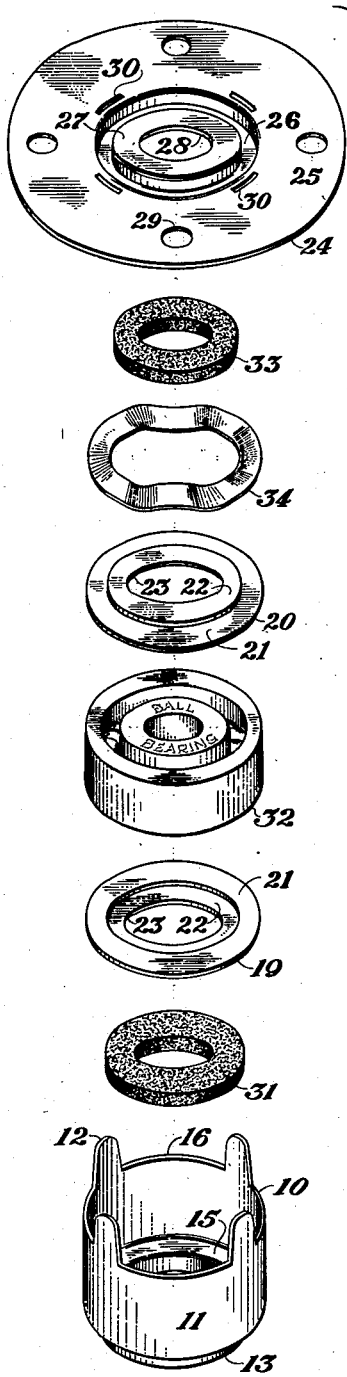
Figure 1 is an exploded view of one modification of the invention showing how the parts are assembled.
Figure 3:
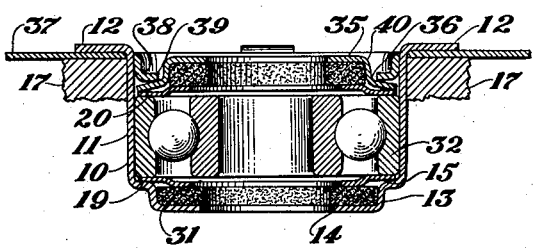
Figure 3 is a cross-sectional view of a second modification of the invention showing the parts in their assembled relationship.

The modification of Fig. 3 is the same in many respects as that of Figs. 1 and 2. Where the parts are the same they have been given the same reference numerals.

Referring to the drawings, the reference numeral 10 represents generally the main supporting cup for the bearing of the present invention. The cup 10 comprises a cylindrical shell 11, supporting lugs or tabs 12 and a narrow annular depressed portion 13 having a shaft opening 14 through its bottom wall. The depressed portion 13 is separated from the main body 11 by a supporting shoulder 15.

The supporting cup 10 is one of the common features of the two modifications of the present invention. The inside and outside diameters of the cylindrical shell 11 must be held very closely to size, the inside diameter to fit the outside diameter of the outer race of the bearing 32 and the outside diameter to fit the inside diameter of the bearing support 17. The distance between the supporting shoulder 15 and the upper edge 16 must be held to substantially exact size, with very little tolerances allowed, in order that the upper edge of the ball bearing be held at the proper height from the upper edge of the bearing support 17 so that the shaft 18 will be properly positioned.

The support 17 forms a separating plate between the motor and fan housings of a suction cleaner.

Prior to the present invention it was the practice to stamp the blanks for the cups to final size prior to the cup drawing operation. The cup was then formed by pressing in drawing dies. The inside and outside diameters of the shell 11 could be held quite closely but the distance between the shoulder 15 and the upper edge 16 of the shell 11 would vary considerably because of variations in the thickness of the stock from which the blanks were made.

According to the present invention some stock is left on that part of the blank which forms the upper edge 16. After the cup drawing operation the upper edge is machined off to form positioning surfaces 16 preferably by a wobble punch guided from the shoulder 15. By such an arrangement the distance between the shoulder 15 and the positioning surfaces 16 can be held quite exactly.

In both modifications a pair of retainer rings 19 and 20 are provided. The rings 19 and 20 may be duplicates, each having a supporting flange 21 and a dished portion 22 having a central opening 23.

In the modification of Figs. 1 and 2 a clamping plate 24 is provided, having a wide supporting flange 25, an annular depressed portion 26 and an annular seal retaining portion 27 having a central opening 28. The flange 25 is provided with fastener receiving openings 29 and openings 30 for receiving supporting tabs 12.

In assembling the modification of Figs. 1 and 2, a sealing ring 31 is placed in depressed portion 13 of the cup 10, the flange 21 of the lower retainer 19 placed on the shoulder 15 with the dished portion 22 resting on the ring 31. The ball bearing 32 is then inserted in the shell 11 with its outer race closely fitting the inside diameter of the shell 11. The flange 21 of the upper retainer is placed on the upper edge of the outer race with the dished portion extending upwardly. A second sealing ring 33 is placed on top of the dished portion of retainer 20 and a wave type spring ring 34 placed on its flange.

The cup 10 is then assembled with clamping plate 24 with tabs 12 extending through openings 30 and bent over against the outer surface of the flange as shown in Fig. 2. The depressed portion 26 of ring 24 will rest on top of the spring ring 34 and hold the parts properly positioned. If desired, the sealing ring 33 may be placed in the portion 27 of plate 24 prior to the assembly operation. The spring ring 34 holds the outer race of the bearing against the flange 21 of ring 19 under a definite predetermined pressure, takes up the slight manufacturing tolerances and prevents the parts from rattling.

The assembly thus formed may be placed in the support 17 and clamped thereto by bolts or rivets passing through openings 29.

The thickness of retaining rings 19 and 20 and clamping plate 24 and the depths of the depressed portion 26 may be held quite closely by the drawing operation. Thus, the machining of the edges 16 of cup 10 after the latter is drawn to form, forms the final tolerance operation which can be held quite accurately, assuring that the shoulder of the shaft 18 will be positioned properly with relation to the top machined edge of the support 17.

In the modification of Fig. 3 a separate upper seal retainer ring 35 is provided. The flange 36 is made springy so that it replaces the spring 34 of the first modification. The clamping plate 37 of Fig. 3 is similar to that of the first modification except that its depressed portion 38 is cut away to form a large central opening 39 surrounding the cup portion 40 of the seal retainer 35. The depressed portion 38 of plate 37 rests on the springy flange 36 of the retainer 35 and the latter takes up the tolerances, prevents the parts from rattling and holds the outer race of the bearing under a definite pressure.

From the foregoing it can be seen that the invention provides a bearing housing which is easy to manufacture and assemble and in which all of the critical dimensions can be held in quite close tolerances.

While I have shown but two modifications of my invention it is to be understood that those modifications are to be taken as illustrative only and not in a limiting sense. I do not wish to be limited to the particular structure shown and described but to include all equivalent variations thereof except as limited by the scope of the claims.

I claim:

1. A bearing assembly comprising; a supporting cup including a cylindrical shell, an inwardly extending annular bearing support at one end of said shell, an inwardly extending annular shoulder beyond said support and forming an annular pocket, positioning surfaces formed on the other end of said shell and supporting tabs extending from said other end of said shell between said positioning surfaces; a first sealing ring positioned within said annular pocket; a first retaining ring having an annular portion engaging said first sealing ring and an annular flange engaging said bearing support; a bearing having one end of its outer race engaging the annular flange of said first retaining ring; a second retaining ring having an annular flange engaging the other end of said race and an annular portion inwardly thereof; a second sealing ring engaging the annular portion of said second retaining ring; all of said rings and said race lying within said cup; and clamping means having openings for receiving the supporting tabs of said shell and engaging the positioning surfaces thereof, said clamping means including means for holding the annular flange of said second retaining means against said race, being formed with an annular pocket for engaging said second sealing ring and having a supporting flange extending outwardly from said cup; said supporting tabs being bent over to lie against the outer surface of said supporting flange.

2. A bearing assembly according to claim 1 in which said clamping means includes an annular spring engaging the annular flange of said second retainer ring.

3. A bearing assembly according to claim 2 in which said clamping means includes a clamping plate having an annular depressed portion engaging said annular spring and in which said supporting flange forms an integral part of said plate.

4. A bearing assembly according to claim 3 in which said clamping means includes a third retaining ring having a pocket for receiving said second sealing ring and in which said annular spring is in the form of a flange extending from said third retaining ring.

5. A bearing assembly comprising; a supporting cup including a cylindrical shell, an inwardly extending annular bearing support at one end of said shell, an inwardly extending annular shoulder beyond said support and forming an annular pocket, positioning surfaces formed on the other end of said shell and supporting tabs extending from said other end of said shell between said positioning surfaces; a first sealing ring positioned within said annular pocket; a first retaining ring having an annular portion engaging said first sealing ring and an annular flange engaging said bearing support; a bearing having one end of its outer race engaging the annular flange of said first retaining ring; a second retaining ring having an annular flange engaging the other end of said race and an annular portion inwardly thereof; a second sealing ring engaging the annular portion of said second retaining ring; all of said rings and said race lying within said cup; a supporting plate engaging the positioning surfaces of said cup, having openings for receiving the supporting tabs thereof and having an annular supporting flange extending outwardly of said cup; said tabs being bent outwardly over the outer surface of said supporting flange; annular means associated with said plate and engaging the annular flange of said second retaining ring; and an annular pocket forming means associated with said plate and engaging the outer surface of said second sealing ring.

6. A bearing assembly according to claim 5 in which said annular means and annular pocket forming means are formed integrally with said supporting plate.

7. A bearing assembly according to claim 5 in which said annular means is formed integrally with said supporting plate and said annular pocket forming means comprises a third retaining ring having an annular flange positioned between said annular means and the annular flange of said second retaining ring.

8. A bearing assembly according to claim 7 in which the annular flange of said third retaining ring is in the form of an annular spring.

9. A bearing assembly comprising; a supporting cup including a cylindrical shell, an inwardly extending annular bearing support at one end of said shell, an inwardly extending annular shoulder beyond said support and forming an annular pocket, positioning surfaces formed on the other end of said shell and supporting tabs extending from said other end of said shell between said positioning surfaces; a first sealing ring positioned within said annular pocket; a first retaining ring having an annular portion engaging said first sealing ring and an annular flange engaging said bearing support; a bearing having one end of its outer race engaging the annular flange of said first retaining ring; a second retaining ring having an annular flange engaging the other end of said race and an annular portion inwardly thereof; a second sealing ring engaging the annular portion of said second retaining ring; an annular spring engaging the annular flange of said second retaining ring, all of said rings, said race and said annular spring lying within said cup; and a supporting plate engaging the positioning surfaces of said cup, having openings therein for receiving the supporting tabs thereof and having an annular supporting flange extending outwardly from said cup; said tabs being bent outwardly into engagement with the outer surface of said supporting plate; an annular depressed portion formed on said supporting plate inwardly of said shell and engaging said annular spring; and an outwardly extending annular pocket formed in said supporting plate and confining said second sealing ring.

10. A bearing assembly comprising; a supporting cup including a cylindrical shell, an inwardly extending annular bearing support at one end of said shell, an inwardly extending annular shoulder beyond said support and forming an annular pocket, positioning surfaces formed on the other end of said shell and supporting tabs extending from said other end of said shell between said positioning surfaces; a first sealing ring positioned within said annular pocket; a first retaining ring having an annular portion engaging said first sealing ring and an annular flange engaging said bearing support; a bearing having one end of its outer race engaging the annular portion of said first retaining ring; a second retaining ring having an annular flange engaging the other end of said race and an annular portion inwardly thereof; a second sealing ring engaging the annular portion of said second retaining ring; a third retaining ring having an annular portion engaging the outer surface of said second sealing ring and an annular springy flange engaging the annular flange of said second retaining ring; all of said rings and said race lying within said cup; and a supporting plate engaging the positioning surface of said cup, having openings for receiving the supporting tabs thereof and having an annular flange extending outwardly of said cup; said tabs being bent outwardly into engagement with the outer surface of said supporting plate; an annular depressed flange formed integrally with the supporting plate inwardly of said shell and engaging the annular flange of said third retaining ring.

References Cited in the file of this patent

UNITED STATES PATENTS

| Number | Name | Date |
| --- | --- | --- |
| 1,801,655 | Brown | Apr. 21, 1931 |
| 2,016,923 | Herrmann | Oct. 8, 1935 |
| 2,155,921 | Anderson | Apr. 25, 1939 |